(12) United States Patent
Vedage et al.

(10) Patent No.: US 8,293,863 B2
(45) Date of Patent: *Oct. 23, 2012

(54) POLYAMIDE CURATIVE FROM SUBSTITUTED AMINE AND DIMER FATTY ACID OR ESTER

(75) Inventors: Gamini Ananda Vedage, Bethlehem, PA (US); Stephan Francis Monaghan, Utrecht (NL); Williams René Edouard Raymond, New Tripoli, PA (US); Michael Ian Cook, de Meern (NL); Michael Paul Popule, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/672,994

(22) Filed: Feb. 9, 2007

(65) Prior Publication Data

US 2007/0287809 A1    Dec. 13, 2007

Related U.S. Application Data

(63) Continuation-in-part of application No. 11/450,834, filed on Jun. 9, 2006, now abandoned.

(51) Int. Cl.
  *C08G 69/02* (2006.01)
  *C08L 63/02* (2006.01)
(52) U.S. Cl. ............... 528/340; 525/420.5; 528/335
(58) Field of Classification Search .......... None
  See application file for complete search history.

(56) References Cited

U.S. PATENT DOCUMENTS

| | | |
|---|---|---|
| 2,705,223 A | 3/1955 | Renfrew et al. |
| 4,247,426 A | 1/1981 | Hinze et al. |
| 4,463,157 A | 7/1984 | Kersten et al. |
| 4,536,339 A | 8/1985 | Ritschel et al. |
| 5,319,062 A | 6/1994 | Kigawa et al. |
| 2008/0114094 A1 | 5/2008 | Shah et al. |

FOREIGN PATENT DOCUMENTS

| | | |
|---|---|---|
| EP | 0 003 246 A1 | 8/1979 |
| EP | 0 074 592 A | 3/1983 |
| EP | 0 134 970 A1 | 3/1985 |
| FR | 2 114 954 A | 6/1972 |
| GB | 2 031 431 A | 4/1980 |
| JP | 53-45397 | 4/1978 |
| JP | 58-57348 A | 4/1983 |
| JP | 05-156004 A | 6/1993 |

OTHER PUBLICATIONS

Peerman et al., "Cyclic End Groups in Polyamide Resins," Journal of the American Chemical Society, vol. 76, Dec. 5, 1954, pp. 6085-6086.*
Chemical abstracts registry No. 56-18-8 for 3,3'-iminobis(propylamine, 1954, one page.*
BASF Corporation, "N4-Amine, N,N'-Bis-(3-Aminopropyl)ethylene-diamine," Amine Curing Agents for the Epoxy Industry: Enabling Innovative Formulations, Website: www.basf.com/usa/intermediates., 2007.
Search Results, Fatty Acids, Tall-Oil, Reaction Products with N,N'-1,2-ethanediyibis[1,3-propanediamine], Reg. No. 93165-37-8, 2007.
Search Results, Fatty Acids, Tall-Oil, Reaction Products with N,N'-1,2-ethanediylbis[1,3-propanediamine], CAS Reg. No. 93165-37-8, EINECS No. 296-922-8., 2007.
Search Results, Fatty Acids, C18-unsatd., Dimers, Polymers with Diethylenetriamine, N,N"-1,2-ethanediylbis[1,3-propanediamine] and Tall-Oil Fatty Acids," CAS Reg. No. 68390-68-1, ECL Serial No. KE-16659, 2007.
Breuer, T. E., "Dimer Acids," Kirk-Othmer Encyclopedia of Chemical Technology, 4th Ed., 1993, vol. 8, pp. 223-237, Wiley, New York.
D.F. Cadogan, et al, Plasticizers, Kirk-Othmer Encyclopedia of Chemical Technology, 4th Ed., 1996, vol. 19, 258-290, Wiley, New York.

* cited by examiner

*Primary Examiner* — Robert Sellers
(74) *Attorney, Agent, or Firm* — Michael K. Boyer

(57) ABSTRACT

The present invention provides polyamide curing agent compositions comprising the reaction products of (1) multifunctional amines of structure 1

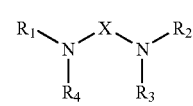

where $R_1$ is CH2CH2CH2NH2; $R_2$, $R_3$ and $R_4$ independently are H or CH2CH2CH2NH2, and X is CH2CH2 or CH2CH2CH2 with (2) dimer fatty acids, optionally in combination with monofunctional fatty acids, the reaction product preferably comprising at least 15 wt % tetrahydropyrimidine-containing components. The curing agent compositions are useful for crosslinking epoxy resins to produce coatings, adhesives, floorings, composites and other articles.

19 Claims, No Drawings

POLYAMIDE CURATIVE FROM SUBSTITUTED AMINE AND DIMER FATTY ACID OR ESTER

CROSS-REFERENCE TO RELATED APPLICATION

The present application is a continuation-in-part of application Ser. No. 11/450,834 filed 9 Jun. 2006, now abandoned.

BACKGROUND OF THE INVENTION

Polyamide curing agents are utilized extensively in many markets for epoxy curing agents including coatings, adhesives, composites, and flooring applications. Polyamide curing agents comprise the reaction products of dimerized fatty acid (dimer acid) and polyethyleneamines, and usually a certain amount of monomeric fatty acid which helps to control molecular weight and viscosity. "Dimerized" or "dimer" or "polymerized" fatty acid refers, in a general way, to polymerized acids obtained from unsaturated fatty acids. They are described more fully in T. E. Breuer, 'Dimer Acids', in J. I. Kroschwitz (ed.), *Kirk-Othmer Encyclopedia of Chemical Technology*, 4$^{th}$ Ed., Wiley, New York, 1993, Vol. 8, pp. 223-237.

Dimer acid is usually prepared by the acid catalyzed oligomerization under pressure of certain monomeric unsaturated fatty acids, usually tall oil fatty acid (TOFA), though sometimes other vegetable acids such as soya fatty acid or cottonseed fatty acid are used. Commercial products generally consist of mostly (>70%) dimeric species, with the rest consisting mostly of trimers and higher oligomers, along with small amounts (generally less than 5%) of monomeric fatty acids. Common monofunctional unsaturated C16 to C22 fatty acids also employed with the dimer acids in making polyamides include tall oil fatty acid (TOFA), soya fatty acid, cottonseed fatty acid or the like.

Any of the higher polyethylene polyamines can be employed in the preparation of polyamide curing agents, such as diethylenetriamine (DETA), triethylenetetramine (TETA), tetraethylenepentamine (TEPA), pentaethylenehexamine (PEHA), hexaethyleneheptamine (HEHA), and the like, though in actual commercial practice the polyethylene polyamine most commonly employed is TETA.

In addition, other monofunctional or difunctional carboxylic acids, or other multifunctional amines may be incorporated into the condensation process in order to provide specialized property enhancements.

Polyethylene polyamines are currently manufactured from the reaction of ammonia with either ethylene dichloride or ethanolamine. As new manufacturing assets are built to produce polyethylene polyamines, there is a tendency to favor the ethanolamine process, as it is less corrosive to the manufacturing equipment, and hence more economical. Unfortunately, the ethanolamine process generally produces less TETA than the ethylene dichloride process, and therefore prices for TETA are increasing relative to the prices for other polyethylene polyamines. There is therefore a need for more economical alternatives to TETA in the manufacture of polyamide curing agents. However, it would be advantageous if such an amine would have a molecular weight, amine hydrogen functionality, and chemical structure similar to TETA so as to minimize difficulties in re-formulation of end use products such as coatings and adhesives.

U.S. Pat. No. 2,705,223 describes epoxy resins cured with polyamides based on polymeric fatty acids and polyethyleneamines.

GB 2,031,431 discloses epoxy resins cured with mixtures of high molecular weight polyoxyalkylene polyamines and N,N'-bis(3-aminopropyl)ethylenediamine.

U.S. Pat. No. 4,463,157 discloses self-curing amide-group-containing aminourea resins produced from a polyaminoamide which has been produced from polyalkylene-polyamines reacted with fatty acids and/or from polyalkylene-polyamines reacted with dimer fatty acids. Table 1 of this patent shows the product of reaction of N,N'-bis(3-aminopropyl)ethylenediamine with ricinene fatty acid.

EP 134,970 describes similar polyaminoamides.

BRIEF SUMMARY OF THE INVENTION

The present invention provides polyamide curing agent compositions comprising the reaction product of (1) an amine component comprising at least one multifunctional amine of structure 1

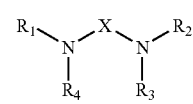

where $R_1$ is CH2CH2CH2NH2; $R_2$, $R_3$ and $R_4$ independently are H or CH2CH2CH2N and X is CH2CH2 or CH2CH2CH2 with (2) a dimer fatty acid or ester component, optionally, containing a monofunctional fatty acid.

In one aspect of the invention $R_2$ and $R_3$ are not H simultaneously.

In another aspect of the invention, the amine component that is reacted with the dimer fatty acid or ester component comprises a mixture of mono-, di-, tri- and tetra-substituted amines of structure 1 in a parts by weight (pbw) ratio of 0 to 50 pbw mono-substituted amine, 50 to 95 pbw di-substituted amine and 0 to 50 pbw tri-substituted amine and 0 to 25 pbw tetra-substituted amine, preferably a ratio of 0 to 20 pbw mono-substituted amine, 60 to 95 pbw di-substituted amine, 0 to 20 pbw tri-substituted amine and 0 to 10 pbw tetra-substituted amine.

In a further aspect of the invention the polyamide curing agent composition, i.e., the reaction product of the amine component and the dimer fatty acid component, comprises at least 15 mole % tetrahydropyrimidine-containing components.

As yet another aspect of the invention, there are provided epoxy systems, or compositions, comprising the contact product of the above polyamide curing agent, or curative, and an epoxy resin.

As an advantage of the current invention, the polyamide curing agent compositions for epoxy resins often provide faster cure speed than polyamide curing agents of the current art. As another advantage of the current invention, curing agent compositions are provided which do not contain triethylenetetramine, but which have physical properties including viscosity, molecular weight and amine hydrogen equivalent weight that closely resemble polyamides derived from triethylenetetramine.

The curing agent compositions are useful for crosslinking epoxy resins to produce coatings, adhesives, floorings, composites and other articles. Thus, another embodiment of the invention comprises coatings, adhesives, floorings, composites, and other cured epoxy articles prepared by curing epoxy resins using such curing agents.

As yet another advantage, when the polyamide curing agent composition contains at least 15 mole % tetrahydropyrimidine-containing components, the curing agent composition affords 2-component polyamide coatings manifesting good coating appearance and fast dry speeds, in many instances dry through times of less than 24 hours.

DETAILED DESCRIPTION OF THE INVENTION

"Dimerized" or "dimer" or "polymerized" fatty acid refers, in a general way, to polymerized acids obtained from unsaturated fatty acids. They are described more fully in T. E. Breuer, as noted above, which description is incorporated by reference. Common monofunctional unsaturated fatty acids used in making the dimer acid compositions include tall oil fatty acid (TOFA), soya fatty acid and cottonseed fatty acid. The dimer acids are prepared by polymerizing the fatty acids under pressure, and then removing most of the unreacted fatty mono-acids by distillation. The final product comprises mostly dimeric acids, but includes trimeric as well as some higher acids. The ratio of dimeric acids to trimeric and higher acids is variable, depending on processing conditions and the unsaturated acid feedstock. The dimer acid may also be further processed by, for example, hydrogenation, which reduces the degree of unsaturation and the color of the product.

Suitable for the purposes of the present invention are dimer acids with a dimer content as measured by GC ranging from about 50 wt % to about 95 wt %, and a trimer and higher acid content of from about 3 wt % to about 40 wt %, the remainder being monomeric fatty acids. However, as the amount of trimer acid is increased, it will be necessary to increase the amount of polyamine and/or the amount of fatty mono-acid in order to maintain the desired viscosity of the final product, since the higher functionality of the trimeric and higher fatty acids will lead to more branching and increase the molecular weight in the product, and may even gel the product, as will be appreciated by those skilled in the art. Esters of dimer acids, particularly the C1 to C4 alkyl esters, can also be employed in the current invention.

Preferred dimer acid components are those with a range of dimeric acids from 75 wt % to 90 wt %, including Empol® 1018 and Empol 1019® (Cognis Corp.), Haridimer 250S (Harima M.I.D., Inc.), Yonglin YLD-70 (Jiangsu Yonglin Chemical Oil Co.), and Unidyme® 18 (Arizona Chemical Co.).

The fatty acids used in the current invention in combination with the dimer acids include C8 to C22, preferably C16 to C22 mono-carboxylic acids containing from 0 to about 4 units of unsaturation. Usually, such fatty acids will be mixtures derived from triglycerides of natural products, such as babassu, castor, coconut, corn, cottonseed, grapeseed, hempseed, kapok, linseed, wild mustard, oiticica, olive, ouri-curi, palm, palm kernel, peanut, perilla, poppyseed, rapeseed, safflower, sesame, soybean, sugarcane, sunflower, tall, teaseed, tung, uchuba, or walnut oils. Pure fatty acids or mixtures of pure fatty acids, such as stearic, palmitic, oleic, linoleic, linolenic, etc. acids may also be employed, as can various esters of any of these fatty acids, particularly the C1 to C4 esters. Also of utility is isostearic acid, also known as monomer acid. Monomer acid is the mostly C18 fatty mono-acid stream derived from the preparation of dimer acid.

The preferred fatty acids to be blended with the dimer acids are tall oil fatty acid and soya fatty acid.

If desired, other monofunctional and multifunctional carboxylic acids may be incorporated into the dimer acid portion of the reaction composition.

The multifunctional amines of structure 1 of the current invention include N-3-aminopropyl ethylenediamine; N,N'-bis(3-aminopropyl)ethylenediamine; N,N-bis(3-aminopropyl)ethylenediamine; N,N,N'-tris(3-aminopropyl)ethylenediamine; N,N,N',N'-tetrakis(3-aminopropyl) ethylenediamine; dipropylene triamine; N-3-aminopropyl-1,3-diaminopropane; N,N'-bis(3-aminopropyl)-1,3-diaminopropane; N,N-bis(3-aminopropyl)-1,3-diaminopropane; and N,N,N'-tris(3-aminopropyl)-1,3-diaminopropane; tetrakis(3-aminopropyl)-1,3-diaminopropane; and mixtures of these amines. These multifunctional amines can be prepared by the Michael reaction of either ethylene diamine or 1,3-diaminopropane with acrylonitrile, followed by hydrogenation over metal catalysts as is well known to those skilled in the art.

A preferred multifunctional amine for use as the amine component is N,N'-bis(3-aminopropyl)ethylenediamine. Most preferred as the amine component is a mixture comprising 0-20 pbw of N-3-aminopropyl ethylenediamine, 60-95 pbw of N,N'-bis(3-aminopropyl)ethylenediamine, 0-20 pbw of N,N,N'-tris(3-aminopropyl)ethylenediamine and 0-10 pbw of N,N,N',N'-tetrakis(3-aminopropyl)ethylenediamine. Such a mixture can be prepared by the reaction sequence described above for making the multifunctional amine without the need to conduct a distillation or other process of separation, except for the optional removal of low molecular weight side products of the reaction which are more volatile than N-3-aminopropyl ethylenediamine. It will be recognized by those skilled in the art that small quantities of other products of hydrogenation may be present in the mixture.

If desired, the curing agent composition may be modified by incorporation of other multifunctional amines. Examples include ethylenediamine, diethylenetriamine, triethylenetetramine, tetraethylenepentamine, higher polyethyleneamines, aminoethylpiperazine, meta-xylylene diamine, the various isomers of diamine-cyclohexane, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly(cyclohexyl-aromatic) amines (MBPCAA) described in U.S. Pat. No. 5,280,091, 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexane-diamine, 3,5,5-trimethyl-1,6-hexanediamine, 2-methyl-1,5-pentanediamine, bis-(3-amino-propyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diamino-cyclohexane, the poly(alkylene oxide)diamines and triamines (such as for example Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001 and also aminopropylated ethylene glycols, propanediols, butanediols, hexanediols, polyethylene glycols, polypropylene glycols and polybutanediols. The polyamide curative composition can either be modified by incorporating these polyamines in the condensation reaction with the dimer acid, or by adding them to the polyamide after completion of the condensation reaction. In the former case, it is then necessary to adjust the ratio of moles of polyamine to equivalents of acid to conform with the guidelines given below.

The percentage of equivalents of fatty mono-acids to total equivalents of monofunctional plus multifunctional acids can be varied from 0 to about 30%, preferably from 3% to 20. The equivalents of acid can be obtained by titration of the starting materials with alcoholic hydroxide, as is well known in the art. Those skilled in the art will recognize that increasing the percentage of monofunctional acid will lower the molecular weight and viscosity of the polyamide. They will also recognize that increasing the trimer and higher acid content of the dimer acid will increase the molecular weight and viscosity of the polyamide.

The ratio of total moles of multifunctional amine to equivalents of acid, along with the functionality of the multifunctional amine, are crucial parameters in determining the molecular weight, viscosity, and other properties of the resulting polyamides. Indeed, if the ratio of amine to acid is not large enough, then the entire composition can gel. Furthermore, this ratio also influences the amine hydrogen equivalent weight (AHEW) of the final product, and has an effect upon the amount of unreacted multifunctional amine present after completion of the condensation reaction. Unreacted multifunctional amine can cause deleterious effects to surface appearance and intercoat adhesion. Suitable ratios of moles of multifunctional amine to equivalents of acid range from about 0.4:1 to about 1.2:1, preferably from 0.5:1 to 1:1. The moles of amine is calculated from the number average molecular weight, if a mixture of amines is employed.

Polyamides of the current invention can be manufactured by any number of processes known to those skilled in the art. Normally, the amines and acids are combined at temperatures ranging from about room temperature to about 100° C. Heat is then supplied to raise the temperature as water is condensed from the reaction mixture. Heating is normally continued until the specified amount of water is removed that will yield a product with the desired amide and imidazoline or tetrahydropyrimidine content. Optionally, vacuum can be applied particularly in the late stages of the process to aid in the removal of water from the mixture. To reduce foaming, which can be a problem particularly under vacuum conditions, small amounts of defoamers may be added to the polyamide composition. Appropriate defoamers include various acrylic copolymers containing 2-ethylhexyl acrylate as part of the copolymer composition, various polysiloxane copolymers, and the like.

During the condensation reaction, it is possible to cause some of the amine functional amides to cyclize with further loss of water to form tetrahydropyrimidines, as shown below for tetrahydropyrimidines. Driving the reaction to form higher levels of tetrahydropyrimidines may influence the properties of the polyamide curing agent, such as, for instance, improving cure speed and improving the appearance of the coating. All possible levels of tetrahydropyrimidine functionality of the polyamide curing agents are considered to be part of the current invention. However, in one desirable aspect the polyamide curing agent composition comprises at least 15 mole % tetrahydropyrimidine-containing components, preferably at least 20 mole % and especially at least 25 mole % tetrahydropyrimidine-containing components, as determined by 13C NMR. In some aspects an upper limit for the tetrahydropyrimidine-containing components would be 75 mole %.

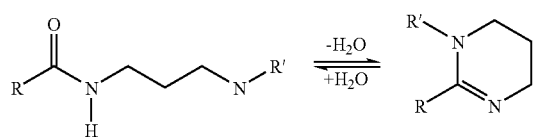

The polyamide curing agent, or hardener, is combined with an epoxy resin which is a polyepoxy compound containing about 2 or more 1,2-epoxy groups per molecule. Such epoxides are described in Y. Tanaka, "Synthesis and Characteristics of Epoxides", in C. A. May, ed., *Epoxy Resins Chemistry and Technology* (Marcel Dekker, 1988), and are incorporated by reference. Such combination of polyamide curing agent and epoxy resin composes a curable epoxy system.

The preferred polyepoxy compounds are the diglycidyl ethers of bisphenol-A, the advanced diglycidyl ethers of bisphenol-A, the diglycidyl ethers of bisphenol-F, and the epoxy novolac resins.

To reduce the viscosity of a given formulation of polyamides of the current invention with a di- or multi-functional epoxy resin, the epoxy resin may be modified with a portion of monofunctional epoxide. In this way viscosity is further reduced, which may be advantageous in certain cases, such as for example to increase the level of pigment in a formulation while still allowing easy application, or to allow the use of a higher molecular weight epoxy resin. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, 2-ethyl-hexanol, and C8 to C14 alcohols and the like.

Polyamides of the current invention would normally be formulated with epoxy resins at stoichiometric ratios of epoxy groups to amine hydrogen ranging from about 1.5 to 1 to about 1 to 1.5. More preferred are ranges from 1.2 to 1 to 1 to 1.2.

It is also possible to modify the polyamides of the current invention by reacting a modest portion of the amine hydrogen with difunctional and monofunctional epoxy resins such as those described above. This is a common practice well known to those skilled in the art, and generally referred to as "adduction". By adducting with difunctional and monofunctional epoxy resins it is possible to improve the compatibility of the polyamide with epoxy resin and thereby reduce problems such as blush, carbonation and exudation as described above, and to increase pot life. On the other hand, such modification tends to increase viscosity, particularly in the case of difunctional epoxy resins, and may in some cases also decrease the rate of cure. Particularly useful epoxy resins for adduction include the diglycidyl ethers of bisphenol-A, the advanced diglycidyl ethers of bisphenol-A, the diglycidyl ethers of and bisphenol-F, styrene oxide, cyclohexene oxide, and the glycidyl ethers of phenol, the cresols, tert-butylphenol and other alkyl phenols, butanol, 2-ethylhexanol, and C8 to C14 alcohols and the like. It is also possible to accomplish a modest level of adduction by mixing the amine and epoxy components and allowing them to stand for some period of time known as an induction period to those skilled in the art, normally 15 to 60 minutes, before application.

In some circumstances it may be advantageous to incorporate so-called accelerators for the epoxy-amine curing reaction in formulations based on polyamides of the current invention. Such accelerators are described in H. Lee and K. Neville, *Handbook of Epoxy Resins*, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl) phenol. Normally, such accelerators are used at levels of 10% or less based on the total weight of binder, and more usually at levels of less than 5%.

In some circumstances it may be advantageous to incorporate plasticizers for the epoxy-amine network in formulations based on polyamides of the current invention. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Such plasticizers are well known to those skilled in the art, and are described more fully in D. F. Cadogan and C. J. Howick, 'Plasticizers', in J. I. Kroschwitz, ed., *Kirk-Othmer Encyclopedia of Chemical Technology*, 4$^{th}$ Ed., Wiley, New York, 1996, Vol. 19, pp. 258-290. Particularly useful plasticizers include benzyl alcohol, nonylphenol, and various esters of phthalic acid. The ester plasticizers would normally be incorporated in the same package as the epoxy resin to minimize reaction with the amine curing agent. Another particularly useful class of plasticizers are hydrocarbon resins, which include toluene-formaldhyde condensates such as Epodil® L, xylene-formaldehyde condensates such as Nikanol® Y50, coumarone-indene resins, and many other hydrocarbon resin modifiers well know to those skilled in the art.

Coatings prepared from polyamides of the current invention and epoxy resins can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system while maintaining solubility of the binder components. Suitable solvents include aromatics, aliphatics, esters, ketones, ethers, alcohols, glycols, glycol ethers, and the like. Particularly useful in the formulation are some level of ketones such as acetone, methyl ethyl ketone, methyl isoamyl ketone, methyl propyl ketone, methyl amyl ketone, diacetone alcohol and the like, which can be used to improve pot life with little or no sacrifice in dry speed. If ester solvents are included in the formulation, it is usually necessary to formulate them in the package containing the epoxy resin, so as to minimize their reaction with the amine curing agent. Sometimes the epoxy resins used in the practice of this invention will be supplied in solvent cut versions, and likewise, it may be of value to use the polyamides of the current invention, or other curing agents used in combination with these polyamides, as solvent-cut versions.

Coatings of this invention can be applied by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

Coatings of this invention can be applied and cured at ambient temperatures ranging from about 0° C. to about 50° C., with temperatures of 10° C. to 40° C. preferred. If desired, these coatings can also be force cured at temperatures up to 150° C. or more.

EXAMPLE 1

Synthesis of 3-aminopropyl-1,3-diaminopropane

To a batch reactor was added 510.4 g of acrylonitrile and 6 g of water. The contents were heated to 60° C. To this mixture was added 85 g of ammonia over 5 hours. The reactor pressure was maintained at 2.4 MPa to keep the ammonia liquid. Once the ammonia addition was completed the reactor temperature was maintained for an additional two hours. The reactor was then cooled and the contents were emptied to yield 572.5 g of the intermediate product.

A 1 liter batch reactor was charged with 100 g of isopropanol and 3.9 g of Raney Co catalyst. The reactor was pressure cycled first with nitrogen and then with hydrogen to remove any traces of entrained air. After pressure cycling, the reactor was filled with 5.5 MPa hydrogen and heated to 120° C. Then 260 g of product from the previous step was added to the reactor over 4 hours. During this time reactor pressure was maintained at 5.5 MPa by supplying hydrogen to it from a one liter ballast tank. Once the addition was over the temperature was maintained at 120° C. for an additional hour to make sure the hydrogenation was complete.

The reactor was cooled down to room temperature, and the product was filtered. The product was analyzed by area percent GC and it contained 74% 3-aminopropyl-1,3-diaminopropane and 14% 1,3-diaminopropane.

EXAMPLE 2

Synthesis of Polyamide from Example 1

To a one liter glass reactor, 380.6 g of dimer acid (Pripol 1012, Uniqema) was added while purging the system slowly with nitrogen. The stirrer was started after the addition of dimer acid and 47.3 g of TOFA (Sylfat FA-1, Arizona Chemical Co.) was added slowly to this system. Next 110.4 g of the product from Example 1 was added over ten minutes and the stirrer rate was increased to 100 rpm. The contents were then heated to 250° C. and 36.5 g of water was removed by distillation. The reactor was cooled down to 140° C. and at this point 263.3 g of xylene was added and the reactor was further cooled to less than 80° C. and finally 122.5 g of isobutyl alcohol was added. The final product was golden-brown in color. The product had an AHEW of 502.

EXAMPLE 3

Synthesis of Mixture of N-3-aminopropyl ethylenediamine, N,N'-bis(3-aminopropyl)ethylenediamine, and N,N,N'-tris(3-aminopropyl)ethylenediamine To a 1 liter batch reactor was added 236 g of ethylenediamine and to that 5 g of water was added, and the contents were heated to 60° C. To this mixture 417 g of acrylonitrile was added over 5 hours. Once the acrylonitrile addition was completed the reactor temperature was maintained for an additional 1.5 hours.

A 1 liter batch reactor was charged with 100 g of isopropanol, 6.6 g of water and 7.5 g of Raney Co catalyst. The reactor was pressure cycled first with nitrogen and then with hydrogen to remove any traces of entrained air. After pressure cycling, the reactor was filled with 5.5 MPa hydrogen and then heated to 120° C. The 500 g of product from the previous step was the added to the reactor over 4 hours. During this time reactor pressure was maintained at 5.5 MPa by supplying hydrogen to it from a one liter ballast tank. Once the addition was over the temperature was maintained at 120° C. for an additional hour to make sure the hydrogenation was complete.

The reactor was cooled down to room temperature, and the product was filtered. The product was analyzed by area percent GC and it contained 6% N-3-aminopropyl ethylenediamine, 80% N,N'-bis(3-aminopropyl)ethylenediamine, and 11% N,N,N'-tris(3-aminopropyl)ethylenediamine and 2% N,N,N',N'-tetrakis(3-aminopropyl)ethylenediamine.

EXAMPLE 4

Synthesis of Polyamide from Example 3

To a one liter glass reactor, 445.0 g of dimer acid (Yonglin YLD-70) was added while purging the system slowly with nitrogen. The stirrer was started after the addition of the dimer acid and 51.0 g of TOFA (Sylfat FA-1 was added slowly to this system. Next 299.4 g of the Example 3 product was added over ten minutes and the stirrer rate was increased to 100 rpm. The contents were then heated to 265° C. and 56.0 g of water was removed by distillation. The reactor was cooled to 65° C. and the contents were emptied to a glass bottle. The final product had an amine value of 361 mg KOH/g, a viscosity of 30,000 mPa·s, a Gardner color of 8 and a calculated amine hydrogen equivalent weight (AHEW) of 110.

EXAMPLE 5

Synthesis of Polyamide from a Mixture of Example 3 and Ethylenediamine

To a one liter glass reactor, 234.9 g of Empol 1018 dimer acid (Cognis) was added while purging the system slowly with nitrogen. The stirrer was started and 26.7 g of TOFA (Sylfat FA-2) was added slowly. Next was added 124.8 g of the amine mixture of Example 3 and 15.6 g of ethylenediamine over ten minutes and the stirrer rate was increased to 100 rpm. The contents were then heated to 265° C. and 27.6 g of water was removed by distillation. The reactor was cooled to 65° C. and the contents were emptied to a glass bottle. The final product had an amine value of 341 mg KOH/g and a viscosity of 36,640 mPa·s.

EXAMPLE 6

Synthesis of Higher Molecular Weight Polyamide from Example 3

To a reactor was added 232 g of Example 3, 106 g of TOFA (Sylfat FA-2) and 572 g of Empol 1018 dimer acid (Cognis). The mixture was heated to 160° C., and which point water began to distill. Over 2 hr., the mixture was heated to 215° C., at which point the pressure was reduced to 150 torr. The temperature was raised to 230° C. over 30 min. The temperature was held until 53.0 g of water had been removed, at which point the contents were cooled. The final product had an amine value of 150 mg KOH/g and a viscosity of 473,600 mPa·s.

EXAMPLES 7-9

Coating Formulations and Properties

A pigmented resin base was prepared in a standard manner by charging 98.8 g of DER® 331 epoxy resin (Dow Chemical Co., EEW=190) and 3.5 g Nuosperse® 657 (Elementis pic) to a dispersion vessel. The vessel was equipped with a high speed mixer employing a Cowles blade. To this 100.8 g TiPure® R900 titanium dioxide (E.I. DuPont de Nemours Co.) and 74.8 g of Luzenac® 10M2 (Luzenac Group) were added under high shear (approx. 4000 rpm) over a 5-10 minute period with a further period of 20-30 minutes dispersion before dilution of this with 71.7 g xylene and 17.9 g butanol followed by further blending for about 5 minutes at lower shear (1000 rpm). This formulated resin base has a viscosity of 200-300 mPa·s and an epoxy equivalent weight of approx. 710.

The resin base was combined with the curing agents indicated in following Table 1 by hand mixing. After mixing and an induction time of 15 minutes coatings were applied to glass panels at 175 microns wet film thickness using a bird-bar applicator. The coated glass panels were evaluated for:

a) Thin Film Set Time using a Beck Koller drying time recorder at a constant temperature of 23° C. and 60% relative humidity. Phase II and Phase III drying times were assigned according to ASTM D5895.

b) Persoz pendulum hardness using a BYK pendulum hardness tester to ISO 1522 standard.

c) Specular gloss was measured using a BYK Micro Tri Gloss model No. 4520 to ISO 2813 standard.

All results are shown in Table 1.

TABLE 1

| | | Example | | |
|---|---|---|---|---|
| | | 7 | 8 | 9 |
| | Polyamide Curing Agent | Ancamide® 350A | Example 4 | Example 5 |
| Formulation | Curing Agent Wt. (g) | 6.0 | 6.0 | 6.0 |
| | Resin Base Wt. (g) | 37.2 | 37.2 | 37.2 |
| | PVC % | 25 | 25 | 25 |
| | Mix Solids (wt & vol %) | 78 & 65 | 78 & 65 | 78 & 65 |
| Handling Properties | Mix Viscosity @ 23° C. (mPa·s) | | | |
| | 0 minutes | 455 | 415 | 390 |
| | 30 minutes | 610 | 690 | 640 |
| Coating Performance | Thin Film Set @ 23° C. | | | |
| | BK - Phase II (hr.) | 6.5 | 3.0 | 3.5 |
| | BK - Phase III (hr.) | 8.0 | 3.5 | 4.0 |
| | Persoz Hardness @ 23° C. | | | |
| | 1 day | 40 | 70 | 85 |
| | 2 day | 110 | 105 | 115 |
| | 7 day | 155 | 140 | 155 |
| | Specular Gloss | | | |
| | 20°/60° | 24/70 | 25/73 | 10/45 |

TABLE 1-continued

| | Example | | |
|---|---|---|---|
| | 7 | 8 | 9 |
| Polyamide Curing Agent | Ancamide® 350A | Example 4 | Example 5 |

Ancamide® 350A curative is a polyamide curing agent based on dimer acid, TOFA and TETA which is available from Air Products and Chemicals, Inc., with a viscosity of 15,000 mPa·s, a Gardner color of 7, an amine value of 360 to 390 mg KOH/g, and an AHEW of 110.

The Thin Film Set Times at 23° C. of coatings derived from the current invention (Examples 8 and 9) are significantly faster than Example 7; with the times taken to reach Phase II and Phase III approximately half of the standard TETA based polyamide (Ancamide® 350A). This is an indication that the current invention exhibits earlier hardness development which may lead to the ability to handle coated components sooner and overcoat quicker, providing the opportunity to increase productivity within the coatings application. The early hardness development is also shown by the one day hardness being significantly higher for Examples 8 and 9 compared to Example 7, with 7 day hardness being comparable. The Example 4 curing agent, however, had an AHEW and amine value within the specified range of the comparative commercially available TETA based polyamide. Though the viscosity of the polyamide of Example 4 was higher than that of the comparative hardener, it surprisingly led to a mixed viscosity that was slightly lower. It is the mix viscosity that determines the applicability of the product, and therefore the ultimate solvent content or VOC of the coating, indicating another advantage of the polyamides of the current invention over those of the current art.

EXAMPLE 10

Dimer acid (Uniquema Pripol 1017) 576 g, N,N'-bis-(3-aminopropyl)ethylenediamine composition (Example 3 reaction product) 366 g and TOFA (Sylfat FA-2) 70 g were mixed together and then heated to 166° C. At 166° C., 18 g of water was removed using a distillation column. When there was no further water in the column, the reactor temperature was increased to 214° C. and a further 10 g of water was removed making the total water take off 28 g. Also, 300 g of the reaction product (Sample 1) was removed for analytical work. Once there was no water remaining in the column, the temperature was raised to 232° C., and the reactor pressure lowered to 150 mm Hg. Under these conditions an additional 10 g of water was removed and collected in the receiver, resulting in a total water take off 38 g. At this point another 100 g of polyamide material was sampled for analysis (Sample 2). Finally, the reactor was heated to 240° C., and the pressure lowered to 25 mm Hg. Under these conditions an additional 11 g of water (49 grams total) was removed and a final sample of the polyamide was taken (Sample 3). Samples 1, 2 and 3 were subjected to 13C NMR analysis to determine the polyamide and the pyrimidine content.

Each sample of the polyamide reaction product was mixed with Epon 828 resin (Bisphenol A diglycidyl ether resin; 190 EEW) at 55 parts by weight per hundred parts Epon 828 resin (phr) until a homogeneous mixture was obtained and after a 30 min aging period the mixtures were cast onto a BK recorder glass plate using a die applicator at 150 microns to make a epoxy-polyamide film. The scale of the BK recorder was set at 24 hrs. The observations for dry-hard and dry-through values were recorded according to the ASTM method for drying times (ASTM D 5895-96).

The analytical results of the respective properties are shown below.

| | Sample # | | |
|---|---|---|---|
| | 1 | 2 | 3 |
| Polyamide Product Composition | | | |
| Polyamide - amide content (mole %) | 100 | 87 | 76 |
| Tetrahydropyrimidine content by NMR (mole %) | 0 | 13 | 24 |
| Coating Performance | | | |
| Dry-Hard (hr) | 10 | 8 | 6.5 |
| Dry-Through (hr) | >24 | >24 | 12.5 |
| Appearance | opaque | opaque | good |

As shown in the results above, it is clear that 2-component epoxy-polyamide films, or coatings, that contain zero to low levels of the pyrimidine ring structure did not give desirable coating properties, such as the appearance, hard dry and dry-through times. It is very important in the coatings industry for 2 component polyamide coatings to demonstrate good coating appearance and fast dry speeds at ambient temperature for improved return to service of the article that has undergone painting. Therefore, to have epoxy systems with ultimate dry through times <24 hr is a recognized performance benefit in the industry. The results clearly show that for desirable properties, polyamide curing agent compositions with greater than about 15 mole % pyrimidine structure content are necessary, as determined by 13C NMR.

Thus, another feature of an aspect of the invention is that the curing agent composition manifests a dry through time of less than 24 hours according ASTM D 5895-96 when mixed with liquid Bisphenol A diglycidyl ether epoxy resin (Epon 828 or Dow DER 331) having an EEW of 190 at 55 phr until homogenous, allowed to mature for 30 minutes and coated at 150 microns.

We claim:

1. A composition comprising a reaction product of (1) an amine component comprising at least one multifunctional amine of structure 1

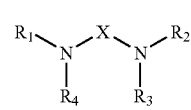

1 where $R_1$ and $R_2$ are CH2CH2CH2NH2; $R_3$ and $R_4$ are H; and X is CH2CH2 with (2) a dimer fatty acid or ester component containing a monofunctional fatty acid, the reaction product comprising at least 24 mole % tetrahydropyrimidine-containing components.

2. The composition of claim 1 in which (2) comprises a dimer component.

3. The composition of claim 1 in which the dimer acid component has a dimer acid content ranging from about 50 wt % to about 95 wt %, and a trimer and higher acid content of from about 3 wt % to about 40 wt %, the remainder being monomeric fatty acid.

4. The composition of claim 3 in which the dimer acid is prepared from tall oil fatty acid, soya fatty acid or cottonseed fatty acid.

5. The composition of claim 2 in which the monofunctional fatty acid is a C16-C22 monocarboxylic acid having from 0 to 4 units of unsaturation.

6. The composition of claim 1 in which the amine component comprises N,N'-bis(3-aminopropyl)ethylenediamine.

7. The composition of claim 5 in which the percentage of equivalents of fatty mono-acids to total equivalents of monofunctional plus multifunctional acids is from 0 to about 30%.

8. The composition of claim 1 wherein the amine component (1) and dimer component (2) are reacted in a ratio of moles of multifunctional amine to equivalents of acid from about 0.4:1 to about 1.2:1.

9. The composition of claim 1 in which the amine component comprises a mixture that comprises N-3-aminopropyl ethylenediamine, N,N'-bis(3-aminopropyl)ethylenediamine, N,N,N'-tris(3-aminopropyl)ethylenediamine and N,N,N'N'-tetrakis(3-aminopropyl)ethylenediamine.

10. A polyamide curative composition comprising a reaction product of (1) an amine component comprising N,N'-bis (3-aminopropyl)ethylenediamine with (2) a dimer fatty acid component which is prepared from tall oil fatty acid, soya fatty acid or cottonseed fatty acid, optionally, containing a C16-C22 monocarboxylic acid having from 0 to 4 units of unsaturation, the reaction product comprising at least 24 mole % tetrahydropyrimidine-containing components.

11. The curative composition of claim 10 which manifests a dry through time of less than 24 hours according ASTM D 5895-96 when mixed with liquid Bisphenol A diglycidyl ether epoxy resin having an EEW of 190 at 55 phr until homogenous, allowed to mature for 30 minutes and coated at 150 microns.

12. The composition of claim 1 further comprising at least one member selected from the group consisting of benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl) phenol.

13. The composition of claim 1 further comprising at least one member selected from the group consisting of organic acids, alcohols, phenols, tertiary amines, and hydroxylamines.

14. The curative composition of claim 10 wherein the amine component of the reaction product comprises N-3-aminopropyl ethylenediamine, N,N'-bis(3-aminopropyl)ethylenediamine, N,N,N'-tris(3-aminopropyl)ethylenediamine and N,N,N',N'-tetrakis(3-aminopropyl)ethylenediamine.

15. The composition of claim 1 wherein the reaction product is formed under heated and vacuum conditions that are sufficient to remove water.

16. The composition of claim 1 wherein water generated during formation of the reaction product is removed by distillation.

17. The composition of claim 1 wherein the monofunctional fatty acid is tall oil fatty acid.

18. The amine component of claim 1 further comprising N-3-aminopropyl ethylenediamine.

19. An epoxy system comprising the composition of claim 1 and an epoxy resin.

* * * * *